(12) United States Patent
Wei et al.

(10) Patent No.: US 9,307,415 B2
(45) Date of Patent: Apr. 5, 2016

(54) METHODS AND APPARATUSES FOR PROVISION OF A DOWNLINK SYNCHRONIZATION GROUP DURING DISCONTINUOUS TRANSMISSION IN AN UNLICENSED BAND

(75) Inventors: Na Wei, Beijing (CN); Wei Bai, Beijing (CN); Pengfei Sun, Beijing (CN); Haiming Wang, Beijing (CN); Chunyan Gao, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 175 days.

(21) Appl. No.: 14/234,028

(22) PCT Filed: Jul. 20, 2011

(86) PCT No.: PCT/CN2011/077363
§ 371 (c)(1),
(2), (4) Date: Jan. 21, 2014

(87) PCT Pub. No.: WO2013/010323
PCT Pub. Date: Jan. 24, 2013

(65) Prior Publication Data
US 2014/0140314 A1  May 22, 2014

(51) Int. Cl.
*H04W 4/00* (2009.01)
*H04W 16/14* (2009.01)
*H04W 48/12* (2009.01)
*H04L 5/00* (2006.01)

(52) U.S. Cl.
CPC ............. *H04W 16/14* (2013.01); *H04L 5/0041* (2013.01); *H04W 48/12* (2013.01)

(58) Field of Classification Search
CPC ..... H04W 16/00; H04W 16/02; H04W 16/14; H04W 48/00; H04W 48/08; H04W 48/12; H04W 72/04; H04L 5/00; H04L 5/0041
See application file for complete search history.

(56) References Cited

U.S. PATENT DOCUMENTS

| 2010/0232308 | A1 | 9/2010 | Yamazaki | |
|---|---|---|---|---|
| 2011/0170527 | A1 | 7/2011 | Yamamoto et al. | |
| 2012/0250631 | A1* | 10/2012 | Hakola | H04L 5/001 370/329 |
| 2013/0265961 | A1* | 10/2013 | Van Phan | H04W 4/00 370/329 |
| 2014/0031054 | A1* | 1/2014 | Zou | H04W 72/1215 455/452.2 |

FOREIGN PATENT DOCUMENTS

| CN | 101478817 | 7/2009 |
|---|---|---|
| CN | 101635983 | 1/2010 |
| JP | 2009267882 | 11/2009 |

* cited by examiner

*Primary Examiner* — Anh Ngoc Nguyen
(74) *Attorney, Agent, or Firm* — Oblon, McClelland, Maier & Neustadt, L.L.P.

(57) ABSTRACT

A method, apparatus and computer program product are provided for generating a downlink synchronization group utilized during a discontinuous transmission in an unlicensed band. A method and apparatus may determine a carrier(s) providing a signal(s) enabling timing and frequency tracking a downlink carrier(s) within a downlink synchronization group to devices responsive to discontinuous transmission via a medium(s) of an unlicensed band on a secondary component carrier. The medium(s) previously utilized to provide content to a device(s). The method and apparatus may also provide an indication of the carrier(s) to the device notifying the device that information of the signal is receivable via the carrier on the unlicensed band. The method and apparatus may also send the signal(s) to the device via the carrier enabling the device to obtain timing and frequency information.

19 Claims, 10 Drawing Sheets

METHODS AND APPARATUSES FOR PROVISION OF A DOWNLINK SYNCHRONIZATION GROUP DURING DISCONTINUOUS TRANSMISSION IN AN UNLICENSED BAND

TECHNOLOGICAL FIELD

Embodiments of the present invention relate generally to wireless communication technology and, more particularly, to a method and apparatus for enabling provision of a downlink synchronization group during discontinuous transmission in an unlicensed band of a communications system.

BACKGROUND

Mobile terminals routinely communicate within a licensed spectrum via networks supervised by various cellular operators. The licensed spectrum, however, has a finite capacity and may become somewhat scarce as the number of mobile terminals that are configured to communicate within the licensed spectrum increases at fairly dramatic rates. As the demands placed upon the licensed spectrum by the various mobile terminals begin to saturate the licensed spectrum, the mobile terminals may experience increasing levels of interference or limited resources with the licensed spectrum potentially eventually becoming a bottleneck for such communications. Therefore, it may be necessary to enable cellular operations on license-exempt bands as well in suitable situations to help offload the traffic.

An increasing number of other network topologies are being integrated with cellular networks. For instance, there might already be some other network system or other cellular system operating in an unlicensed band. These other network topologies include, for example, wireless fidelity (WiFi) networks, ad hoc networks and various other local area networks. The terminals, either mobile or fixed, supported by these other network topologies may communicate with one another in an unlicensed spectrum, such as a licensed-exempt industrial scientific medical (ISM) radio band. The ISM radio band supports other non-cellular systems, such as WiFi systems operating in accordance with the Institute of Electrical and Electronics Engineers (IEEE) 802.11 standard, ZigBee systems operating in accordance with the IEEE 802.15 standard, Bluetooth systems and universal serial bus (USB) wireless systems. In this regard, the ISM radio band may include the 2.4 GHz ISM band in which WiFi 802.11b and 802.11g systems operate and the 5 GHz ISM band in which WiFi 802.11a systems operate. Though cellular technologies have not generally been deployed in the ISM band, such deployment could be considered for local-area Long Term Evolution (LTE) cellular networks as long as they meet the regulatory requirements in country-specific ISM bands, e.g., Federal Communications Commission (FCC) in the United States. Another example of a license exempt band is TV White Space (TVWS), which has been investigated widely in the recent years due to the large available bandwidths at suitable frequencies (e.g., TV spectrum in the 54-698 MHz range in the U.S.) for different radio applications. In the United States, the FCC has regulated licensed or license-exempt TV bands for the secondary-system applications, e.g., cellular, WiFi, WiMax, etc., on TV Band Devices (TVBD).

In an instance in which an LTE system is deployed in a licensed band, the LTE system is typically designed for continuous transmission, since a corresponding network operator may need to buy a certain spectrum for the network operator's usage. However, in order to deploy an LTE system in a shared band without any modification, the LTE system may generally occupy the spectrum all the time, and may totally, or partially, block any other system's usage, which may be unfair and may violate a regulatory requirement of an unlicensed band.

In this regard, for LTE transmissions in an unlicensed band, the LTE may need to use frequency sharing or time sharing, or both schemes, in order to coexist with other systems in a fair manner.

BRIEF SUMMARY OF EXAMPLE EMBODIMENTS

A method, apparatus and computer program product are therefore provided in accordance with an example embodiment to facilitate the establishment of communications, such as non-cellular communications or cellular communications in a license-exempt band. In this regard, some example embodiments may enable provision of a downlink synchronization group(s) on an unlicensed band of a secondary cell carrier (also referred to herein as secondary component carrier) in an instance in which one or more other systems may be deployed in same band (e.g., the unlicensed band). In some example embodiments, provision of a downlink synchronization group(s) may be performed in a carrier aggregation system (e.g., a LTE carrier aggregation system) utilizing licensed band carriers as well as unlicensed band carriers. As such, some example embodiments may facilitate optional coexistence of systems.

By utilizing one or more downlink synchronization groups some example embodiments may facilitate provision of an always on tracking carrier to enable fast synchronization of time and frequency alignment of communication devices in an instance in which there may be discontinuous transmission of a medium (e.g., a channel(s)) utilized by the communication devices in an unlicensed band of a secondary cell carrier.

In one example embodiment, a method is provided that determines at least one carrier to provide at least one signal. The at least one signal may enable timing and frequency tracking of one or more downlink carriers within a downlink synchronization group to one or more devices in response to discontinuous transmission via at least one medium of an unlicensed band on a secondary component carrier. The at least one medium was previously utilized to provide content to at least one of the devices. The method may further include enabling provision of an indication of the determined carrier to the at least one device to notify the device that information associated with the signal is receivable via the carrier on the unlicensed band. The method may further include directing sending of the signal to the device via the carrier to enable the device to obtain timing and frequency information of the downlink carriers.

In another example embodiment, an apparatus is provided that includes at least one processor and at least one memory including computer program code with the at least one memory and the computer program code being configured to, with the at least one processor cause the apparatus at least to determine at least one carrier to provide at least one signal. The at least one signal may enable timing and frequency tracking of one or more downlink carriers within a downlink synchronization group to one or more devices in response to discontinuous transmission via at least one medium of an unlicensed band on a secondary component carrier. The at least one medium was previously utilized to provide content to at least one of the devices. The at least one memory and the computer program code are also configured to, with the at least one processor, cause the apparatus to enable provision of an indication of the determined carrier to the at least one device to notify the device that information associated with the signal is receivable via the carrier on the unlicensed band. The at least one memory and the computer program code are also configured to, with the at least one processor, cause the apparatus to direct sending of the signal to the device via the carrier to enable the device to obtain timing and frequency information of the downlink carriers.

In yet another example embodiment, a method is provided that includes receiving an indication of at least one determined carrier to provide at least one signal. The at least one signal may enable timing and frequency tracking of one or more downlink carriers within a downlink synchronization group in response to a discontinuous transmission via at least one medium of an unlicensed band on a secondary component carrier. The at least one medium was previously utilized to receive content provided by a device. The method may further include receiving the signal via the carrier on the unlicensed band to continue tracking of timing and frequency information of the downlink carriers.

In yet another example embodiment, an apparatus is provided that includes at least one processor and at least one memory including computer program code with the at least one memory and the computer program code being configured to, with the at least one processor, cause the apparatus at least to receive an indication of at least one determined carrier to provide at least one signal. The at least one signal may enable timing and frequency tracking of one or more downlink carriers within a downlink synchronization group in response to a discontinuous transmission via at least one medium of an unlicensed band on a secondary component carrier. The at least one medium was previously utilized to receive content provided by a device. The at least one memory and the computer program code are also configured to, with the at least one processor, cause the apparatus to receive the signal via the carrier on the unlicensed band to continue tracking of timing and frequency information of the downlink carriers.

BRIEF DESCRIPTION OF THE SEVERAL VIEWS OF THE DRAWINGS

Figure 1:
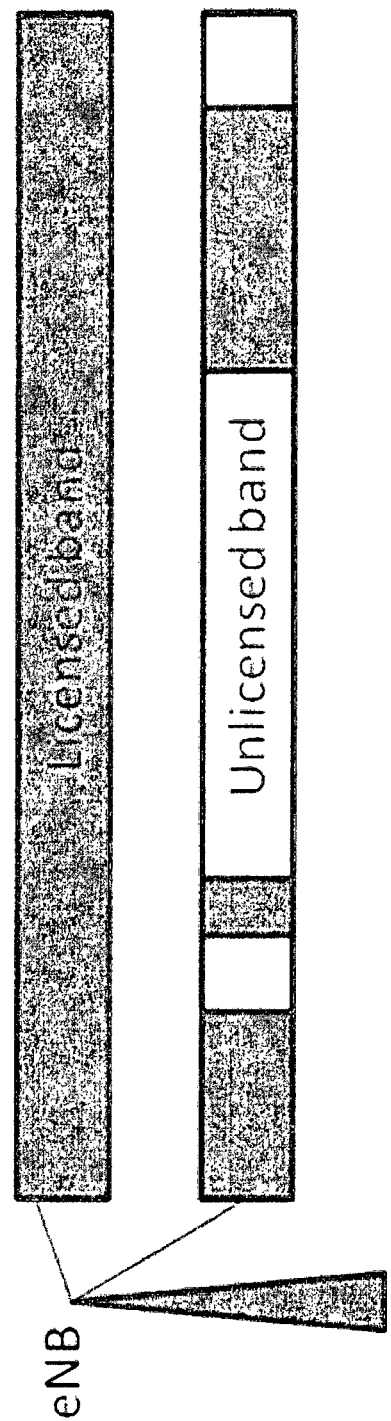
Figure 2:
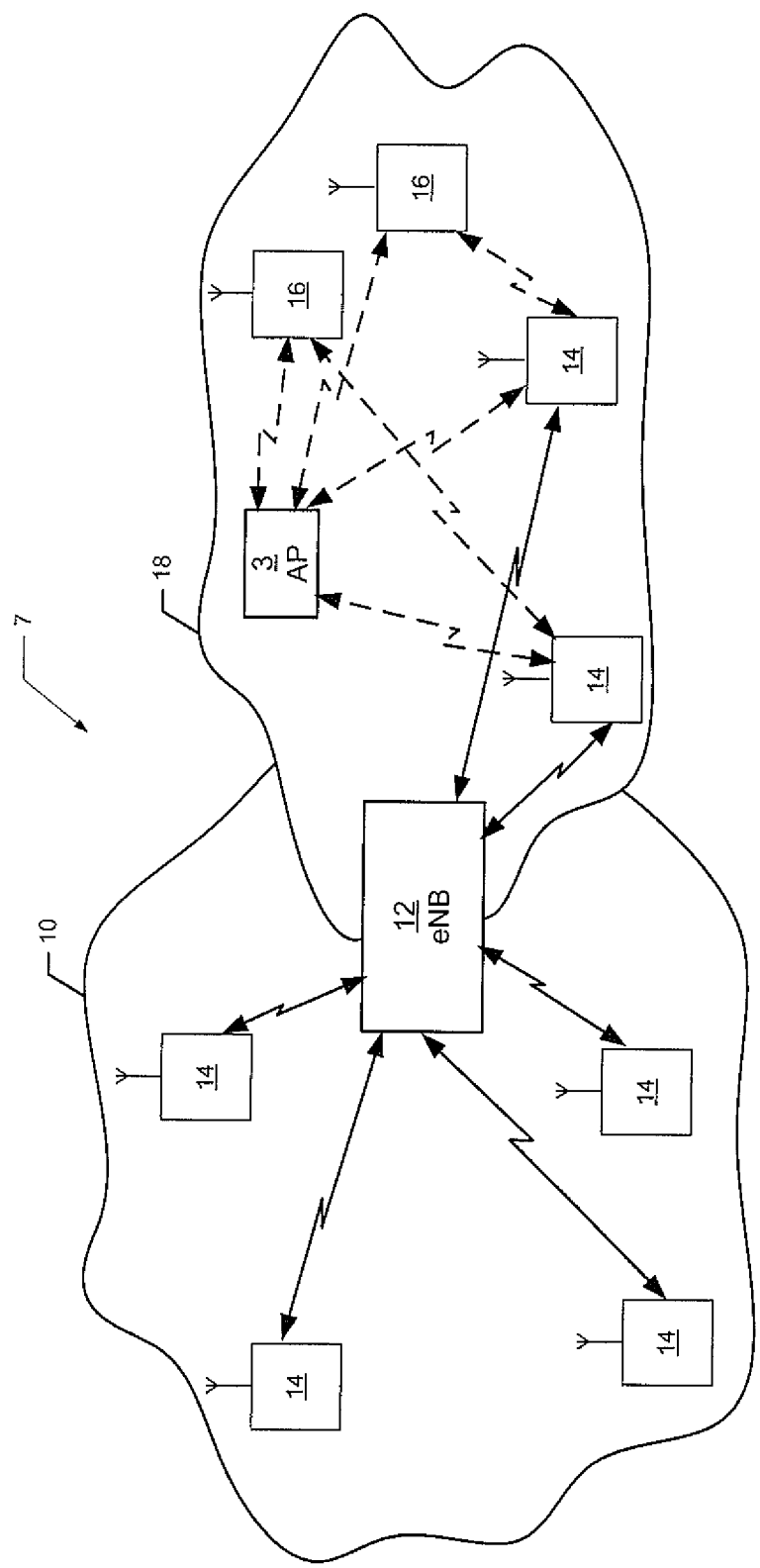
Figure 3:
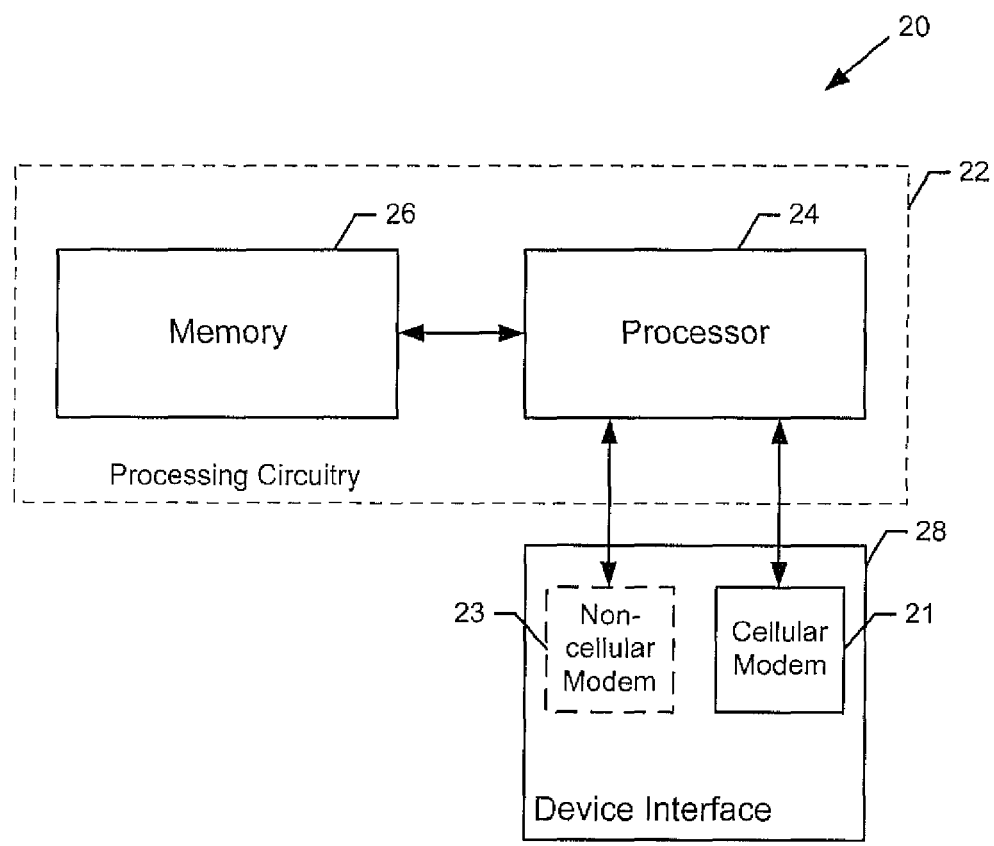
Figure 4:
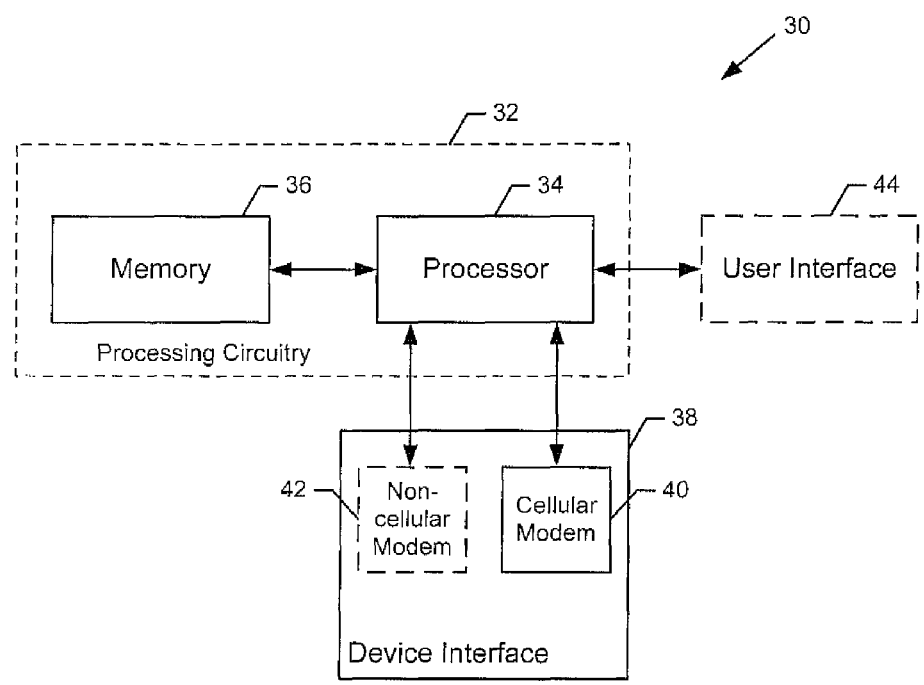
Figure 5:
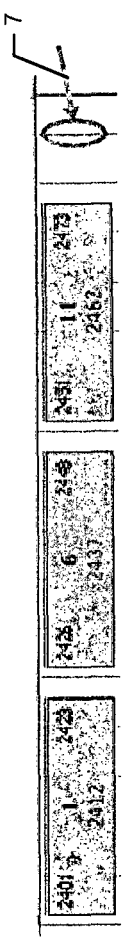
Figure 6:
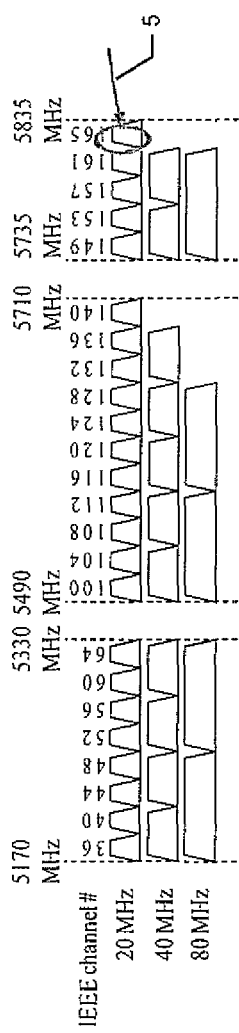
Figure 7:
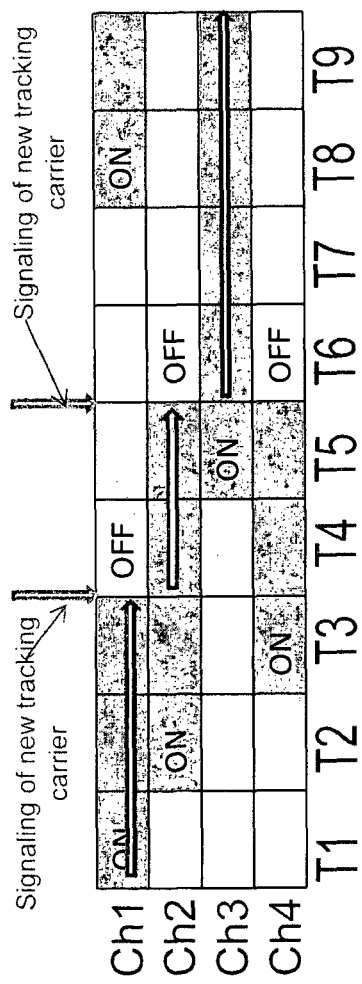
Figure 8:
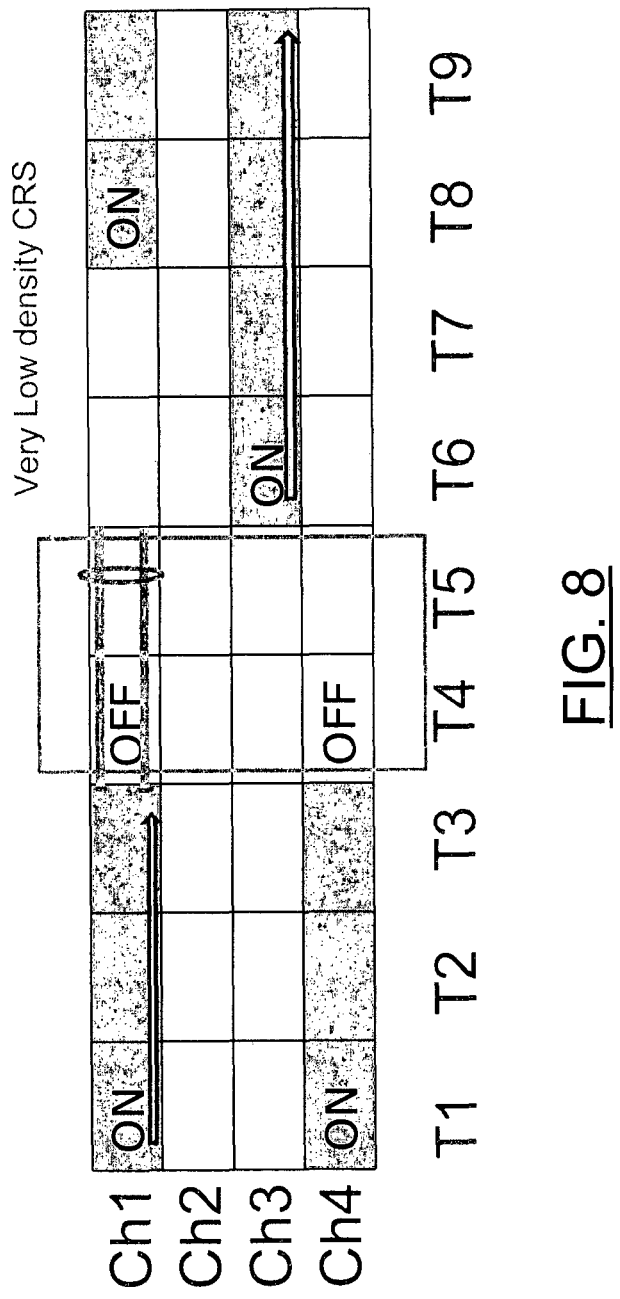
Figure 9:
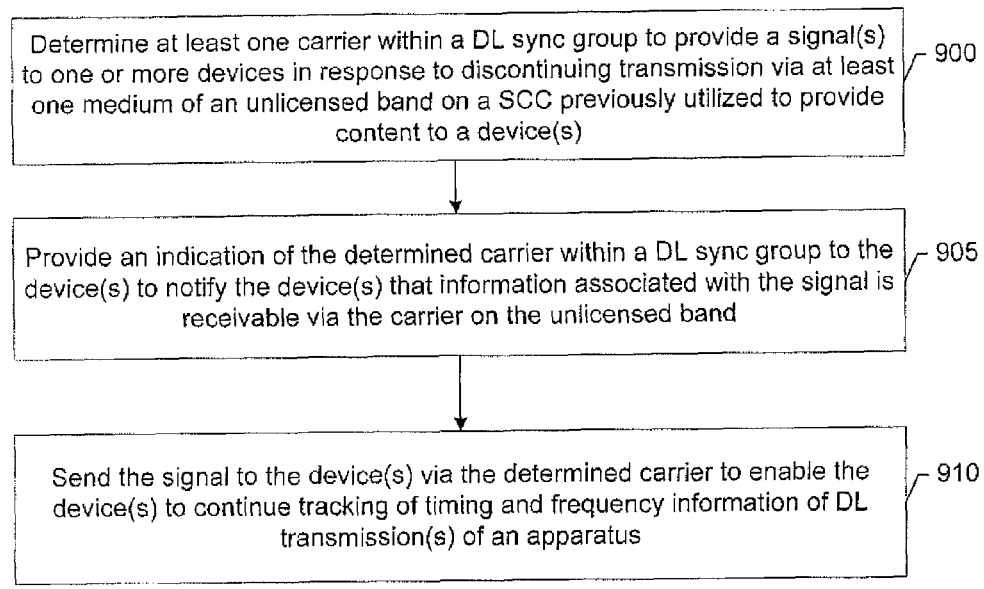
Figure 10:
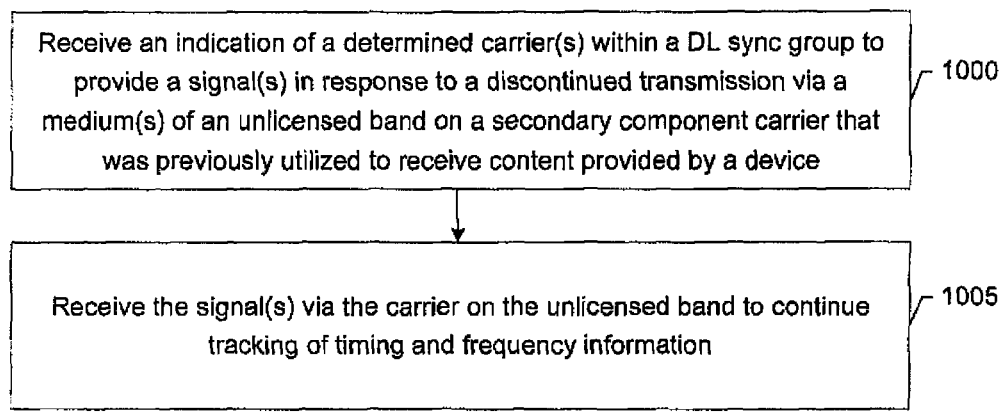

Having thus described the invention in general terms, reference will now be made to the accompanying drawings, which are not necessarily drawn to scale, and wherein:

FIG. 1 is one example of a communications system according to an embodiment of the invention;

FIG. 2 is a diagram of a system according to an example embodiment of the invention;

FIG. 3 is a schematic block diagram of an apparatus from the perspective of a base station in accordance with an example embodiment of the invention;

FIG. 4 is a block diagram of an apparatus from the perspective of a terminal in accordance with an example embodiment of the invention;

FIG. 5 is a diagram illustrating a tracking carrier being provided in a guard band of one or more channels in an unlicensed band according to an example embodiment;

FIG. 6 is a diagram illustrating a tracking carrier being provided in a free/available channel of an unlicensed band according to an example embodiment of the invention;

FIG. 7 is a diagram illustrating one or more tracking carriers being provided in different channels over time according to an example embodiment of the invention;

FIG. 8 is a diagram illustrating one or more tracking carriers being provided in different channels over time according to an alternative example embodiment of the invention;

FIG. 9 illustrates a flowchart for enabling provision of a downlink synchronization group to utilize one or more tracking carriers for synchronization of time and frequency of communication devices in an efficient manner according to an example embodiment of the invention; and FIG. 10 illustrates a flowchart for enabling receipt of a downlink synchronization group to utilize one or more tracking carriers for synchronization of time and frequency in an efficient manner according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, in some example embodiments, a tracking carrier(s) may, but need not, refer to a carrier(s) such as, for example, a medium(s) or channel(s) configured to provide timing and frequency information to one or more communication devices (e.g., User Equipment (UE(s)).

As described above, in order to provide LTE transmissions in unlicensed band, an LTE system may need to utilize frequency sharing or time sharing, or both schemes, in order to coexist with other systems (e.g., a WiFi system, a WLAN system) in an unlicensed band in a fair manner. For instance, when an LTE system is deployed in a shared band such as, for example, a licensed band and an unlicensed band, without any modification, the LTE system may continuously transmit and may keep on occupying the spectrum all the time and may block another system's usage. Thus, a discontinuous type of transmission may be needed for an LTE system.

In this regard, during a turned off period, the LTE system may typically shut off all transmissions to allow transmissions via a medium for another system. The turn off of LTE system typically relates to turning off all channels of an LTE uplink as well as a LTE downlink, since any signal may cause another system(s) (e.g., a WiFi system, a WLAN system) to misinterpret that the medium is busy.

In this scenario, in an instance in which the LTE system may turn off all transmissions to allow another system to utilize a medium(s) of an unlicensed band, a UE may lose synchronization in time and frequency since there may be no continuous Common Reference Signal (CRS) transmission in this carrier. After an evolved Node B (eNB) turns on the communications system again, the UE may need some time to perform time and frequency compensation first before the UE is able to start reliably receiving and/or transmitting data. For instance, in general, before a UE may start reliably receiving data such as, for example, a packet(s), the UE may need to perform timing and frequency offset compensation before channel estimation. The time and frequency offset may take some time for an UE to reach enough accuracy in an instance in which the turn off period may be long.

On the other hand, in an instance in which an LTE system is turned on in an unlicensed band, it is typically desirable that the UE may be able to start receiving data such as, for example, a packet(s) immediately to improve the efficiency of resource utilization due to a potential limited turn on period. For example, in order for a medium busy traffic 802.11 system to maintain a reasonable delay, less than 50 ms extra delay may be desired. In this regard, an LTE system may use a channel that becomes available for a duration prior to expiration of, or up to, 50 ms.

As such, some example embodiments may provide a reliable manner in which to enable communication devices such as, for example, UEs to obtain time and frequency information in a fast and efficient manner even in an instance in which there may be discontinuous transmission with the communication devices and a medium(s) of the unlicensed band.

Referring now to FIG. 1, in accordance with an example embodiment of the invention, a communication system is provided in which a network entity, such as, for example, an access point, a base station, an evolved node B (eNB) or the like, may utilize carrier aggregation and in this regard may communicate with a licensed band carrier(s) as well as an unlicensed band carrier(s).

Referring now to FIG. 2, a schematic block diagram of a communications system according to an example embodiment is provided. In the example embodiment of FIG. 2, the base station, an eNB 12 (also referred to herein as a base station 12) or the like, may communicate with a plurality of terminals in the licensed spectrum and may optionally in a license-exempt band 18 (also referred to herein as unlicensed band 18), such as within the ISM band or the TVWS band. While a communications system that provides coordination of communication using carrier aggregation in a licensed band and an unlicensed band may be configured in various different manners, FIG. 2 illustrates a generic system diagram in which a terminal(s) (e.g., first terminal 14), such as a mobile terminal(s), may communicate in a licensed spectrum as well as license-exempt band 18 with the network 10, such as by the exchange of cellular signals as shown in the solid lightening bolts in FIG. 2. Additionally, the terminal, such as a mobile terminal may communicate in a license-exempt band 18, such as, but not limited to, the ISM band and/or TVWS, and in the license-exempt band 18 there may be other terminals/network(s) communicating with each other as shown in the dashed lightening bolts. As shown in FIG. 2, an embodiment of a system 7 in accordance with an example embodiment of the invention may include a set of first terminals 14 and a set of second terminals 16. The first terminals 14 may each be capable of communication, such as cellular communication, in the licensed band, as well as the license-exempt band, with a network 10 (e.g., a cellular network). In some example embodiments, the first terminals 14 may communicate with the eNB 12 and/or an access point (AP) 3 (a WiFi AP, a wireless local area network (WLAN) AP)) in the license-exempt band 18. Some terminals 16 may form another network, which may be a cellular system(s) or a non-cellular system(s). The first terminals 14 may be configured to communicate (e.g., directly) with one or more of the second terminals 16 (e.g., Wifi stations, WLAN stations, etc.) as well as the AP 3 in a license-exempt band 18. The first terminals 14 may be configured to listen to signaling on the license-exempt band 18. While each set of the first and second terminals is shown to include multiple terminals, either set or both sets may include a single terminal in other embodiments. While the cellular network may be configured in accordance with Long Term Evolution (LTE), the network may employ other mobile access mechanisms such as wideband code division multiple access (W-CDMA), CDMA2000, global system for mobile communications (GSM), general packet radio service (GPRS), LTE-Advanced (LTE-A) and/or the like. The non-cellular network (e.g., unlicensed band 18) may, but need not, be configured in IEEE 802.11 systems or other shared band technologies.

The network 10 may include a collection of various different nodes, devices or functions that may be in communication with each other via corresponding wired and/or wireless interfaces. As such, the illustration of FIG. 2 should be understood to be an example of a broad view of certain elements of the system and not an all inclusive or detailed view of the system or the network. One or more communication terminals such as the first terminals 14 and second terminals 16 may be in communication with each other or other devices via the licensed band of the network 10 and/or the unlicensed band 18. In some cases, each of the communication terminals may include an antenna or antennas for transmitting signals to and for receiving signals from an access point (e.g., AP 3), base station, node B, eNB (e.g., eNB 12) or the like. Although one eNB 12 and one AP 3 is shown as part of the system of FIG. 2, it should be pointed out that any suitable number of eNBs 12 and APs 3 may be part of the system of FIG. 2 without departing from the spirit and scope of the invention. The eNB may be, for example, part of one or more cellular or mobile networks or public land mobile networks (PLMNs). In turn, other devices such as processing devices (e.g., personal computers, server computers or the like) may be coupled to the terminals via the network.

In some example embodiments, the first terminals 14 may be one or more mobile communication devices (e.g., user equipment (UE)) such as, for example, a mobile telephone, portable digital assistant (PDA), pager, laptop computer, or any of numerous other hand held or portable communication devices, computation devices, content generation devices, content consumption devices, or combinations thereof. Alternatively, the first terminals may be fixed communication devices that are not configured to be mobile or portable. In either instance, the terminals may include one or more processors that may define processing circuitry either alone or in combination with one or more memories. The processing circuitry may utilize instructions stored in the memory to cause the terminals to operate in a particular way or execute specific functionality when the instructions are executed by the one or more processors. The first terminals may also include communication circuitry and corresponding hardware/software to enable communication with other devices.

The second terminals 16 may be communication devices such as, for example, a WiFi station, a WLAN station (according to a WLAN technique such as, for example, IEEE 802.11 techniques), a Bluetooth station or the like(s)).

Referring now to FIG. 3, a schematic block diagram of an apparatus according to an example embodiment is provided. In the example embodiment of FIG. 3, the eNB 12 may be embodied as or otherwise include an apparatus 20 as generically represented by the block diagram of FIG. 3. In this regard, the apparatus may be configured to communicate with the sets of first and second terminals 14, 16. While one embodiment of the apparatus is illustrated and described below, it should be noted that the components, devices or elements described below may not be mandatory and thus some may be omitted in certain embodiments. Additionally, some embodiments may include further or different components, devices or elements beyond those shown and described herein.

As shown in FIG. 3, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the invention. In some example embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28. As such, the processing circuitry may be embodied as a circuit chip (e.g., an integrated circuit chip) configured (e.g., with hardware, software or a combination of hardware and software) to perform operations described herein in relation to the eNB 12.

The device interface 28 may include one or more interface mechanisms for enabling communication with other devices, such as the sets of first and second terminals 14, 16. In some cases, the device interface may be any means such as a device or circuitry embodied in either hardware, or a combination of hardware and software that is configured to receive and/or transmit data from/to a network and/or any other device or module in communication with the processing circuitry 22. In this regard, the device interface may include, for example, an antenna (or multiple antennas) and supporting hardware and/or software for enabling communications with a wireless communication network and/or a communication modem, such as a cellular modem 21 (e.g., an LTE modem), and/or an optional non-cellular modem 23 (e.g., a WiFi modem, WLAN modem, etc.) for enabling communications with the sets of first and second terminals. In an example embodiment the cellular modem 21 may be configured to facilitate communications via a primary cell (PCell) on a licensed band (for example, of network 10) and the optional non-cellular modem 23 may be able to facilitate communications via a secondary cell (SCell) on the unlicensed band 18.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In one example embodiment, the first terminals 14 (also referred to herein as user equipment (UE) 14) may be embodied as or otherwise include an apparatus 30 as generically represented by the block diagram of FIG. 4. In this regard, the apparatus may be configured to provide for communications in the licensed spectrum, such as cellular communications, with the eNB 12 or another terminal and communications in the license-exempt band, such as non-cellular communications, with another terminal (e.g., second terminal 16, AP 3). While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

As shown in FIG. 4, the apparatus 30 may include or otherwise be in communication with processing circuitry 32 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 32 may include a processor 34 and memory 36 that may be in communication with or otherwise control a device interface 38 and, in some cases, a user interface 44. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal, the processing circuitry may be embodied as a portion of a mobile computing device or other mobile terminal.

The optional user interface 44 may be in communication with the processing circuitry 32 to receive an indication of a user input at the user interface and/or to provide an audible, visual, mechanical or other output to the user. As such, the user interface in the context of a mobile terminal may include, for example, a keyboard, a mouse, a joystick, a display, a touch screen, a microphone, a speaker, and/or other input/output mechanisms.

The device interface 38 may include one or more interface mechanisms for enabling communication with other devices and/or networks. In some cases, the device interface may be any means such as a device or circuitry embodied in either hardware, or a combination of hardware and software that is configured to receive and/or transmit data from/to a network and/or any other device or module in communication with the processing circuitry 32. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In the illustrated embodiment, for example, the device interface includes a cellular modem 40 (e.g., an LTE modem) for supporting communications in the licensed spectrum, such as communications with the eNB 12, and an optional non-cellular modem 42 (e.g., a WiFi modem, WLAN modem, Bluetooth (BT) modem, etc.) for supporting communications in the license exempt band 18, such as non-cellular communications, e.g., communications in the ISM band and/or the TVWS band, with other terminals (e.g., second terminals 16 (e.g., a WiFi station, a WLAN station, etc.), as well as AP 3, or any other suitable devices.

In an example embodiment, the memory 36 may include one or more non-transitory memory devices such as, for example, volatile and/or non-volatile memory that may be either fixed or removable. The memory may be configured to store information, data, applications, instructions or the like for enabling the apparatus 30 to carry out various functions in accordance with example embodiments of the present invention. For example, the memory could be configured to buffer input data for processing by the processor 34. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 34 may be embodied in a number of different ways. For example, the processor may be embodied as various processing means such as one or more of a microprocessor or other processing element, a coprocessor, a controller or various other computing or processing devices including integrated circuits such as, for example, an ASIC, an FPGA or the like. In an example embodiment, the processor may be configured to execute instructions stored in the memory 36 or otherwise accessible to the processor. As such, whether configured by hardware or by a combination of hardware and software, the processor may represent an entity (e.g., physically embodied in circuitry—in the form of processing circuitry 32) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In some example embodiments, an eNB (e.g., eNB 12 (e.g., LTE eNB 12)) may need to turn off transmissions (e.g., LTE transmissions) in an unlicensed band (e.g., unlicensed band 18) from time to time to allow transmissions of other systems (e.g., a WiFi system, a WLAN system, etc.). For instance, the turning off of the transmissions, by the eNB (e.g., eNB 12), may relate to turning off one or more channels (e.g., a medium (for example, a wireless medium)) in the unlicensed band 18 that were previously being utilized by the eNB to communicate with one or more UEs. Before a UE 14 may start receiving data including, but not limited to, a packet(s), the UE 14 may need to perform timing and frequency offset compensation before channel estimation. During the turned off period, some example embodiments may enable one or more UEs 14 to utilize a channel(s) (also referred to herein as an always on channel(s)) in an unlicensed band (e.g., unlicensed band 18) to enable the UEs 14 to perform frequency and time tracking. In this regard, the UEs 14 of the example embodiments may not lose synchronization in time and frequency after the eNB 12 turns on the transmissions (e.g., LTE transmissions) to the channel(s) that were previously being used by the eNB 12 to communicate with the UEs 14. In this manner, the UEs 14 may start receiving data immediately.

In order to enable one or more UEs 14 to utilize a channel(s) in an unlicensed band to enable the UEs 14 to perform frequency and time tracking via the low bandwidth channel(s), the eNB 12 may define and generate a downlink (DL) synchronization group related to one or more unlicensed band carriers. The downlink synchronization (sync) group generated by the eNB 12 may specify or include information related to one or more of the following properties: (1) within the DL synchronization group, DL timing/frequency tracking for a UE(s) may be performed in a tracking component carrier (TCC) and the UE may apply directly the timing/ frequency compensation to all other carriers based on the information from the tracking carrier; (2) the eNB may offer synchronized DL transmissions and may use a same oscillator within the DL synchronization group in which the oscillator(s) may be used to generate signals in wireless receivers and transmitters and there may be drift in the carrier frequency and timing of the signal due to an imperfection of the oscillator(s); (3) in an instance in which one or more configured carriers are within a DL sync group, a UE(s) may assume that the time is aligned in those carriers and that the same oscillator is used among carriers; (4) in an Remote Radio Head (RRH) scenario, the carriers may be configured as a different group depending on the location of an antenna; (5) in an instance in which there may be a large frequency difference scenario, the carriers may be configured as a different group depending on a frequency band; (6) as long as the tracking carrier is working properly, a UE may be configured to remain ready to receive data in any of the carriers identified in the DL sync group, even when an LTE signal is OFF in these carriers; and (7) in an instance in which there may be a standalone LTE deployment on a shared band, a tracking carrier may be an anchor carrier which may be used to carry system control channels.

The eNB 12 may send the information associated with the DL synch group as well as setup and modification information to one or more of the UEs 14 via a Radio Resource Control (RRC) and/or Medium Access Control (MAC) signaling. An example embodiment of a RRC signaling of a downlink synchronization group configuration is provided below.

```
DLsynGrooupInfo ::=    SEQUENCE (
    groupID                    INTEGER (1,..4)
    physCellId1                PhysCellId,
    physCellId2                PhysCellId,
    ...
}
```

In an example embodiment, the information related to the DL synch group may be included, by the eNB 12, inside a Scell configuration RRC signaling or as a separate group based on RRC/MAC signaling. In addition, the relevant signaling related to the DL synch group may be transmitted by the eNB 12 to the UEs 14 in the licensed band (e.g., cellular) of the network 10. In an alternative example embodiment, in an instance in which a standalone LTE deployment in an unlicensed band may be provided, the relevant signaling information may be transmitted on an anchor carrier.

The eNB 12 may deploy one or more tracking carriers in the following instances, as described more fully below: (1) a low bandwidth, low power, low density channel in an unlicensed band (e.g., unlicensed band 18); (2) a free unlicensed channel which no other system may be operating on; (3) a virtual always on tracking carrier in which the tracking carrier may be switched among physically different channels over time, for example, at one time, there may be a channel considered as the tracking carrier; and (4) any other suitable instances. For example, while the eNB 12 may check to ensure there is an always on tracking carrier in the DL synch group, there may be a possibility that at one time, there is no carrier that may be made active for a data signal (e.g., an LTE data signal), and therefore the tracking carrier may be discontinued. In this instance, the eNB 12 may continue to transmit one or more low density common reference signals (CRS(s)) in a channel(s) (e.g., a tracking carrier), until the eNB 12 signals a new tracking carrier with or without data or a control channel, as described more fully below.

In an instance in which the eNB 12 may utilize the always on tracking carrier in which the tracking carrier may be switched among physically different channels over time, the eNB 12 may utilize layer 1 (L1) or Medium Access Control (MAC) fast signaling from the eNB 12 to inform one or more UEs 14 to switch the tracking carrier as necessary, which may include the information on which carrier corresponds to the new tracking carrier.

The indication of tracking carrier (also referred to herein as track carrier) may be designed, by the eNB 12 according to a certain frequency hopping pattern, or may be informed by explicit layer 1 or MAC signaling. The tracking carrier(s), generated by the eNB 12 may include, but is not limited to, one or more common reference signals (CRS(s)) and optionally also data and control channels, as well as any other suitable information. The tracking carrier(s), generated by the eNB 12, may have one or more of the following properties: (1) the density, bandwidth, hopping pattern, power, periodicity, etc. of a CRS(s) which may be used for tracking purposes may be configured by the eNB 12; (2) the eNB 12 may configure whether the data and control channels are available in a tracking carrier(s); (3) the eNB 12 may configure higher density CRS(s) in an instance in which a system (e.g., LTE system) is likely to turn on soon; (4) the eNB 12 may decrease the density, even to zero when a system (e.g., LTE system) is not expected to turn on soon; and (5) the eNB 12 (e.g., an LTE eNB 12) may, but need not, inform one or more CRS configurations to coexisting systems in the unlicensed band (e.g., unlicensed band 18) of the secondary cell carrier (SCC).

Referring now to FIG. 5, a diagram illustrating a tracking carrier in a guard band according to an example embodiment is provided. In the example embodiment of FIG. 5, in an instance in which the eNB 12 may turn off transmissions to a channel(s) that was previously being used by the eNB 12 to communicate with one or more UEs 14 so that another system(s) (e.g., a WiFi system, a Bluetooth system) in the unlicensed band (e.g., unlicensed band 18) may utilize the channel(s), the eNB 12 may determine another carrier in which to provide downlink carrier timing and frequency information to the UEs 14 during this off time. The downlink carrier timing and frequency information may be provided by the eNB 12 in terms of a CRS(s) or any other type of reference signal(s) which may be utilized by UEs 14 to perform timing and frequency tracking. In the example embodiment of FIG. 5, the eNB 12 may determine that the carriers on channels 1, 6, and 11 (e.g., WiFi channels) and guard band carrier 7 (also referred to herein as guard band 7) are part of a DL sync group and the eNB 12 may provide the DL synch group information to one or more UEs 14. The DL synch group may be provided by the eNB 12 to the UEs 14 via the licensed band (e.g., cellular) of a PCC (e.g., network 10). In this regard, the UEs 14 may be made aware, by the eNB 12, that the UEs 14 may receive a CRS(s) via the guard band carrier 7 which may be the tracking carrier, in this example embodiment.

In this manner, for example, during the off time of the transmissions to the previously used channel(s), the eNB 12 may transmit CRS information in one or more guard bands of detected channels (e.g., WiFi channels). In one example embodiment, the guard bands may, but need not be detected, by the non-cellular modem 23 (e.g., a WiFi modem in one example embodiment) of the eNB 12 or a WiFi modem of WiFi AP 3 and/or one or more second terminals 16 (e.g., WiFi stations) which might be detecting or sensing energy on the channels (e.g., WiFi channels 1, 6, and 11). In this regard, the eNB 12 may provide one or more low bandwidth signals (e.g., CRSs) in the guard bands (e.g., guard band 7) to one or more of the UEs 14. As such, in the example embodiment of FIG. 5, one or more guard bands (e.g., guard band 7) may correspond to the tracking carrier. The UEs 14 may utilize the information associated with the low bandwidth CRS signals to enable fast synchronization of time and frequency when the eNB 12 turns on transmissions again to the channel(s) or medium that was previously being used to communicate with the UEs 14. It should be pointed out that the transmission of the low bandwidth signals may not interfere with the detected channels (e.g., Wifi channels 1, 6 and 11) since the low bandwidth signals may be low power, low density signals. For example, the low bandwidth signals may, but need not, be a no-data low bandwidth, low power CRS tracking carrier to keep the interference to an adjacent carrier as low as possible.

Referring now to FIG. 6, a diagram illustrating a free channel for usage as a tracking carrier according to an example embodiment is provided. In the example embodiment of FIG. 6, in an instance in which the eNB 12 may turn off transmissions to a channel(s) that was previously being used by the eNB 12 to communicate with one or more UEs 14 so that another system(s) in the unlicensed band (e.g., unlicensed band 18) may utilize the channel(s), the eNB 12 may determine another carrier in which to provide timing and frequency information to the UEs 14 during this off time. In the example embodiment of FIG. 6, the eNB 12 may determine that there may be some carriers (for e.g., for WiFi with a transmission bandwidth of 80 MHz, an LTE system may be time shared with WiFi on channels 149, 153, 157, 161, etc.) and a free carrier (e.g., free carrier 5 (also referred to herein as detected free channel 5)) that may be part of a DL sync group and the eNB 12 may provide the DL synch group information to one or more UEs 14. The DL synch group may be provided by the eNB 12 to the UEs 14 via the licensed band (e.g., cellular) of a PCC (e.g., network 10). In this regard, the UEs 14 may be made aware, by the eNB 12, that the UEs 14 may receive synchronized DL transmissions via the detected channel 5 which may be the tracking carrier, in this example embodiment.

In this regard, for instance, during the off time of the transmissions to the previously used channel(s), the eNB 12 may transmit a CRS(s) with or without data in another detected free or available channel. The CRS(s) may be provided by the eNB 12 to one or more of the UEs 14. The non-cellular modem 23 of the eNB 12 may determine that the channel 5 may be detected as a free unlicensed channel which no other system may be currently using. In this regard, the eNB 12 may provide a CRS(s) in the channel 5 (e.g., IEEE channel 165) detected as being free or available to one or more UEs 14. In the example embodiment of FIG. 6, the detected free channel 5 may correspond to the tracking carrier. The UEs 14 may utilize the information associated with the CRS(s) in channel 5 to enable fast synchronization of time and frequency in an instance in which the eNB 12 turns on transmissions again to the channel(s) or medium that was previously being used to communicate with the UEs 14 within this synchronization group.

Referring now to FIG. 7, a diagram illustrating an always on tracking carrier is provided according to an example embodiment. In the example embodiment of FIG. 7, in an instance in which the eNB 12 may turn off transmissions to a channel(s) that was previously being used by the eNB 12 to communicate with one or more UEs 14 so that another system(s) in the unlicensed band (e.g., unlicensed band 18) may utilize the channel(s), the eNB 12 may determine another carrier in which to provide a CRS(s) to the UEs 14 during this off time. For instance, during the off time of the transmissions to the previously used channel(s), the eNB 12 may transmit a CRS(s) to one or more UEs 14 using one or more different physical channels over time. In the example embodiment of FIG. 7, the eNB 12 may identify and use a channel(s), based on the eNB 12 determining instances in which the channels may be free or idle (for example, during different time slots). For instance, the eNB 12 may determine that one or more channels may be free or idle during certain time slots in instances in which the channels are not being used by another system (e.g., a WiFi system, another LTE system of another operator) during a time slot(s). In this regard, for purposes of illustration and not of limitation, in the example embodiment of FIG. 7, the eNB 12 may determine that four channels in an unlicensed band (e.g., unlicensed band 18) of a SCC may be free/available or idle during some time slots. In one example embodiment of FIG. 7, the eNB 12 may know when the four channels are free and may be turned ON by the eNB 12 and when the four channels are OFF, since the eNB 12 may be the entity/device turning the channels ON and OFF during particular time slots. The four channels (e.g., Channels 1-4) may, for example, be Wifi channels, LTE channels or a combination of WiFi channels and LTE channels. In the example embodiment of FIG. 7, the eNB 12 may determine that the four channels (e.g., Channels 1-4) are part of the DL synch group and may provide the DL synch group information to one or more UEs 14. The DL synch group may be provided by the eNB 12 to the UEs 14 via the licensed band (e.g., cellular) of a PCC (e.g., network 10). In this regard, the UEs 14 may be made aware that the UEs 14 may receive synchronized DL transmissions from carriers (e.g., channels) of the DL synch group.

After detecting that the four channels in the unlicensed band are free during different time slots, the eNB 12 may turn on the channels during the free time slots and may transmit a CRS(s) to one or more UEs 14 during some of the time slots in which the channels are free/available. In this regard, the eNB 12 may determine that the tracking carrier (e.g., the channel(s) carrying the CRS) may be switched among different physical channels over time. For instance, in the example embodiment of FIG. 7, the eNB 12 may determine that the CRS(s) may be sent to one or more UEs 14 via Channel 1 (Ch 1) during time slots one through three when Channel 1 is turned ON by the eNB 12. Since the eNB 12 may know that Channel 1 is planned to be OFF after the third time slot, the eNB 12 may switch the channel (e.g., the tracking carrier) for transmission of the CRS(s). In this regard, the eNB 12 may check other channels (e.g., carriers) ON duration and may determine that it may be better to change the tracking carrier to Channel 2 (Ch 2) for the next two time slots, for example spanning time slots four and five. The eNB 12 may determine that it is better to switch to channel 2 because channel 2 may have the longest ON duration before a next OFF duration of the channels. In an instance in which the eNB 12 switches from channel 1 to channel 2, the eNB 12 may send signaling of the new tracking carrier to the UEs 14. The eNB 12 may send the indication of the new/changed tracking carrier to the UEs 14 via a licensed band (e.g., cellular) of a PCC (also referred to herein as primary component carrier) to inform the UEs 14 that the tracking carrier has changed.

Since the eNB 12 may know that the Channel 2 is planned to be OFF after the fifth time slot, the eNB 12 may switch the channel (e.g., the tracking carrier) to channel 3 for the remaining time slots (e.g., time slots six through nine) in which the CRS(s) is transmitted to the UEs 14. When the eNB 12 switches from Channel 2 to Channel 3, the eNB 12 may send an indication of the new tracking carrier to the UEs 14. The eNB 12 may send the indication of the new/changed tracking carrier to the UEs 14 via a licensed band (e.g., cellular) of a PCC. By switching the tracking carrier to different channels that are ON over time, the eNB 12 may generate an always on tracking carrier in instances in which there are overlapping ON durations of the channels (e.g., Channels 1-4) of a DL sync group.

In some example embodiments, all channels of a DL synch group may not have an overlapping ON duration (also referred to herein as non-overlapping time period) over one or more time periods. In this regard, the eNB 12 may extend an ON period of a channel in one or more carriers or may continue to transmit low density common reference signals (CRS(s)) in an OFF period in a tracking carrier as described more fully below.

Referring now to FIG. 8, a diagram illustrating a tracking carrier according to an example embodiment is provided. As shown in the example embodiment of FIG. 8, the eNB 12 may determine that there may not be any overlapping ON duration across channels 1-4, which may be part of a DL synch group, for time slots four and five (e.g., T4, T5). In this regard, in one example embodiment, the eNB 12 may extend the ON period in one of the carriers (e.g., Ch 1) for the purpose of providing the CRS(s) to the UEs 14, for example. As such, the eNB 12 may utilize Channel 1 (Ch 1) to provide the CRS(s) during time slots one through three since Channel 1 is ON during these time slots and the eNB 12 may extend the ON period of Channel 1 for time slots four and five which was designated/assigned for turning OFF transmissions for channel 1 during time slots four and five. After time slot 5, or prior to the expiration of time slot 5, the eNB 12 may check other channels to determine the ON durations of other channels in order to decide whether to switch the tracking carrier to another channel. In this example embodiment, the eNB 12 may switch the channel to Channel 3. The eNB 12 may switch the channel to Channel 3 since Channel 3 may have the longest ON duration remaining for a time period (e.g., time slots six through nine).

In an alternative example embodiment, instead of the eNB 12 extending the ON duration of Channel 1 during time slots four and five, the eNB 12 may transmit one or more low density CRSs during the OFF duration of time slots four and five in Channel 1 to one or more UEs 14. In this regard, the eNB 12 may turn OFF data transmissions during time slots four and five in channel 1, but may instead transmit the very low density CRS(s) during time slots four and five via Channel 1 in which one or more of the UEs 14 may utilize to continue tracking of the timing and frequency information. The low density CRS(s) may not interfere with another system using Channel 1 during time slots four and five since the low density CRS(s) may be low power, low bandwidth signals.

After time slot 5, or prior to the expiration of time slot 5, the eNB 12 may check other channels to determine the ON durations of other channels in order to decide whether to switch the tracking carrier to another channel. In this alternative example embodiment, the eNB 12 may switch the channel from Channel 1 to Channel 3 and as such the new tracking carrier may correspond to Channel 3 for a remaining time period (e.g., time slots six through nine).

Referring now to FIG. 9, a flowchart of an example embodiment of enabling generation of a downlink synchronization group utilized during a discontinuous transmission in an unlicensed band is provided. At operation 900, an apparatus (e.g., eNB 12) may determine at least one carrier within a DL sync group to provide at least one signal (e.g., a CRS(s)) to one or more devices (e.g., UEs 14) in response to discontinuous transmission via at least one medium (e.g., a channel) of an unlicensed band (e.g., unlicensed band 18) on a secondary component carrier within this DL sync group. The medium of the unlicensed band may be previously utilized, by the apparatus (e.g., eNB 12) to provide content to at least one of the devices (e.g., a UE(s) 14). At operation 905, an apparatus (e.g., eNB 12) may provide an indication of the determined carrier within a DL sync group to the device to notify the device that information associated with the signal (e.g., CRS(s)) is receivable via the carrier (e.g., a guard band(s), a free channel(s), and/or one or more channels) on the unlicensed band (e.g., unlicensed band 18). At operation 910, an apparatus (e.g., eNB 12) may send the signal (e.g., CRS(s)) to the device via the determined carrier to enable the device to continue tracking of timing and frequency information of DL transmission(s) of an apparatus (e.g., eNB 12). In this regard, the signal sent to the device (e.g., a UE(s) 14), by the apparatus, enabling the device to continue tracking of timing and frequency information may enable the device to facilitate receipt of data (e.g., a packet, etc.) via the medium in response to transmissions via the medium being resumed by the apparatus (e.g., eNB 12).

Referring now to FIG. 10, a flowchart of an example embodiment of enabling receipt of a generated downlink synchronization group utilized during a discontinuous transmission in an unlicensed band is provided. At operation 1000, an apparatus (e.g., a UE(s) 14) may receive an indication of at least one determined carrier within a DL synch group to provide a signal(s) (e.g., a CRS(s)) in response to a discontinuous transmission via a medium(s) (e.g., a channel(s)) of an unlicensed band (e.g., unlicensed band 18) on a secondary component carrier that was previously utilized to receive content provided by a device (e.g., eNB 12). At operation 1005, an apparatus (e.g., a UE(s) 14) may receive the signal(s) (e.g., CRS(s)) via the carrier on the unlicensed band to continue tracking of timing and frequency information. The continued tracking of timing and frequency information may enable the apparatus (e.g., a UE(s) 14) to receive data (e.g., a packet(s)) via the medium(s) in response to transmissions via the medium(s) being resumed by the device (e.g., eNB 12).

It should be pointed out that FIGS. 9 and 10 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 26, memory 36) and executed by a processor (e.g., processor 24, processor 34). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 9 and 10 above may comprise a processor (e.g., the processor 24, the processor 34) configured to perform some or each of the operations (900-910, 1000-1005) described above. The processor may, for example, be configured to perform the operations (900-910, 1000-1005) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (900-910, 1000-1005) may comprise, for example, the processor 24 (e.g., as means for performing any of the operations described above), the processor 34 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining at least one carrier to provide at least one signal which enables timing and frequency tracking of one or more downlink carriers within a downlink synchronization group to one or more devices in response to discontinuous transmission via at least one medium of an unlicensed band on a secondary component carrier previously utilized to provide content to at least one of the devices;
   providing of an indication of the determined carrier to the device to notify the device that information associated with the signal is receivable via the carrier on the unlicensed band; and
   controlling sending of the signal to the device via the carrier to enable the device to obtain timing and frequency information of the downlink carriers.

2. An apparatus comprising:
   at least one processor; and
   at least one memory including computer program code, wherein the at least one memory and the computer program code are configured to, with the at least one processor, cause the apparatus to at least perform:
      determining at least one carrier to provide at least one signal which enables timing and frequency tracking of one or more downlink carriers within a downlink synchronization group to one or more devices in response to discontinuous transmission via at least one medium of an unlicensed band on a secondary component carrier previously utilized to provide content to at least one of the devices;
      providing an indication of the determined carrier to the device to notify the device that information associated with the signal is receivable via the carrier on the unlicensed band; and
      controlling sending of the signal to the device via the carrier to enable the device to obtain timing and frequency information of the downlink carriers.

3. The apparatus of claim 2, wherein the memory and the computer program code are configured to, with the processor, cause the apparatus to:
   control sending of the signal to the device via the carrier to enable the device to obtain timing and frequency information of the downlink carriers to facilitate receipt of data via the medium in response to transmissions via the medium being resumed by the apparatus.

4. The apparatus of claim 2, wherein the timing and frequency information comprises timing and frequency information of the downlink carriers configured to facilitate swift receipt of the data.

5. The apparatus of claim 2, wherein prior to determining at least one carrier, the memory and the computer program code are configured to, with the processor, cause the apparatus to:
   define a group of unlicensed band carriers to form the downlink synchronization group in which the downlink synchronization group comprises one or more properties indicating that downlink timing or frequency tracking for the device is configured to be performed in a tracking component carrier of the unlicensed band carriers and indicating to the device to directly apply timing or frequency compensation to other carriers of the unlicensed band carriers based on information from the tracking component carrier.

6. The apparatus of claim 2, wherein the signal comprises a common reference signal comprising a density, a bandwidth, a power periodicity, or a hopping pattern.

7. The apparatus of claim 2, wherein the memory and the computer program code are configured to, with the processor, cause the apparatus to:
   provide the indication to the device via a licensed band of a primary component carrier.

8. The apparatus of claim 2, wherein the memory and the computer program code are configured to, with the processor, cause the apparatus to:
   analyze spectrum of the unlicensed band to identify at least one available channel that is not currently being utilized; and
   assign the identified channel as the determined carrier to provide the signal to the device.

9. The apparatus of claim 2, wherein the memory and the computer program code are configured to, with the processor, cause the apparatus to:

determine one or more on durations and one or more off durations of one or more channels of the unlicensed band; and enable transmission of portions of the signal to the device during respective on durations of the channels over time.

10. The apparatus of claim 9, wherein the memory and the computer program code are configured to, with the processor, cause the apparatus to:

identify at least one non-overlapping time period, during the time, of the channels in which the channels are initially assigned to turn off; and extend an on duration of a respective channel for the duration of the non-overlapping time period to enable provision of the portions of the signal via the respective channel to the device during the non-overlapping time period.

11. The apparatus of claim 9, wherein the memory and the computer program code are configured to, with the processor, cause the apparatus to:

identify at least one non-overlapping time period, during the time, of the channels in which the channels are assigned to turn off; and direct transmission of one or more low density common reference signals via a respective channel, of the channels, during the non-overlapping time period to enable provision of the timing and frequency information to the device.

12. The apparatus of claim 2, wherein the apparatus comprises a base station.

13. An apparatus comprising:

at least one processor; and at least one memory including computer program code, wherein the at least one memory and the computer program code are configured to, with the at least one processor, cause the apparatus to at least perform:

receiving an indication of at least one determined carrier to provide at least one synchronization signal enabling timing and frequency tracking of one or more downlink carriers within a downlink synchronization group in response to a discontinuous transmission via at least one medium of an unlicensed band on a secondary component carrier that was previously utilized to receive content provided by a device; and receiving the synchronization signal via the determined carrier on the unlicensed band to continue tracking of timing and frequency of the downlink carriers information to enable receipt of data via the medium in response to transmissions via the medium being resumed by the device.

14. The apparatus of claim 13, wherein the continuing of the tracking the timing and frequency information is configured to facilitate swift receipt of the data.

15. The apparatus of claim 13, wherein the memory and the computer program code are configured to, with the processor, cause the apparatus to:

receive the indication by receiving a defined group of unlicensed band carriers forming the downlink synchronization group in which the downlink synchronization group comprises one or more properties indicating that downlink timing or frequency tracking for the apparatus is configured to be performed in a tracking component carrier of the unlicensed band carriers and indicating to the apparatus to directly apply timing or frequency compensation to other carriers of the unlicensed band carriers based on information from the tracking component carrier.

16. The apparatus of claim 13, wherein the memory and the computer program code are configured to, with the processor, cause the apparatus to:

receive portions of the signal from the device during respective on durations of a plurality of channels of the unlicensed band over time.

17. The apparatus of claim 16, wherein the memory and the computer program code are configured to, with the processor, cause the apparatus to:

receive at least a subset of the portions of the signal via a respective channel, of the channels, from the device during at least one identified non-overlapping time period of the channels in which the channels are initially assigned to turn off.

18. The apparatus of claim 16, wherein the memory and the computer program code are configured to, with the processor, cause the apparatus to:

receive one or more low density common reference signals via a respective channel, of the channels, during at least one identified non-overlapping time period to facilitate receipt of the timing and frequency information, the non-overlapping time period corresponding to a time in which the channels are assigned to turn off.

19. The apparatus of claim 13, wherein the apparatus comprises a mobile terminal and wherein the processor is configured for use in a Long Term Evolution system.

* * * * *